(12) United States Patent
Wilson et al.

(10) Patent No.: US 10,991,013 B2
(45) Date of Patent: Apr. 27, 2021

(54) PRESENTATION OF MEDIA CONTENT BASED ON COMPUTING DEVICE CONTEXT

(71) Applicant: Apple Inc., Cupertino, CA (US)

(72) Inventors: David T. Wilson, Campbell, CA (US); Thomas Alsina, Mountain View, CA (US)

(73) Assignee: APPLE INC., San Jose, CA (US)

( * ) Notice: Subject to any disclaimer, the term of this patent is extended or adjusted under 35 U.S.C. 154(b) by 552 days.

(21) Appl. No.: 14/728,791

(22) Filed: Jun. 2, 2015

(65) Prior Publication Data

US 2016/0358230 A1 Dec. 8, 2016

(51) Int. Cl.
G06Q 30/02 (2012.01)

(52) U.S. Cl.
CPC ..... G06Q 30/0277 (2013.01); G06Q 30/0272 (2013.01)

(58) Field of Classification Search
USPC ............................................ 725/32; 705/14.4
See application file for complete search history.

(56) References Cited

U.S. PATENT DOCUMENTS

| | | | | |
|---|---|---|---|---|
| 7,698,178 B2* | 4/2010 | Chu | | G06Q 30/0242 |
| | | | | 705/28 |
| 7,930,687 B2 | 4/2011 | Moorthy et al. | | |
| 8,667,533 B2 | 3/2014 | Apfel et al. | | |
| 8,745,753 B1* | 6/2014 | Gottlieb | | G06Q 30/0277 |
| | | | | 726/26 |
| 9,032,066 B1* | 5/2015 | Erdmann | | G06F 21/53 |
| | | | | 709/224 |
| 9,749,438 B1* | 8/2017 | Wen | | H04L 67/303 |
| 9,876,896 B1* | 1/2018 | Gailloux | | H04L 63/06 |
| 2005/0198587 A1* | 9/2005 | Pennell | | G06F 21/50 |
| | | | | 715/781 |
| 2007/0089127 A1* | 4/2007 | Flickinger | | G06Q 30/02 |
| | | | | 725/32 |
| 2009/0164287 A1* | 6/2009 | Kies | | G06Q 30/0277 |
| | | | | 705/1.1 |
| 2010/0036785 A1* | 2/2010 | Tzruya | | G06Q 30/0251 |
| | | | | 706/45 |
| 2011/0208616 A1 | 8/2011 | Gorman et al. | | |
| 2012/0072272 A1* | 3/2012 | Kilar | | G06Q 30/02 |
| | | | | 705/14.4 |
| 2012/0253939 A1* | 10/2012 | Grigoriev | | G06Q 30/0251 |
| | | | | 705/14.61 |

(Continued)

FOREIGN PATENT DOCUMENTS

WO 2012/103121 8/2012

OTHER PUBLICATIONS

How to Write Advertisemehts That Sell, A. Shaw Company, 1912.*

*Primary Examiner* — David J Stoltenberg
(74) *Attorney, Agent, or Firm* — Polsinelli LLP

(57) ABSTRACT

Disclosed herein are systems, methods, and non-transitory computer-readable storage media for determining a context of a client device and selecting media content items to present at the client device based on their compatibility with the context. The context is based at least on the co-presentation rules associated with the content previously presented at the client device. Available media content items, such as invitational content items are evaluated with respect to the context, and presented according to their compatibility with at least a present context at the client device.

28 Claims, 5 Drawing Sheets

(56) References Cited

U.S. PATENT DOCUMENTS

| | | | |
|---|---|---|---|
| 2012/0264504 A1* | 10/2012 | Gagner | G07F 17/323 463/25 |
| 2013/0086577 A1* | 4/2013 | Nakashima | G06F 8/61 717/178 |
| 2014/0317538 A1 | 10/2014 | Pollock et al. | |
| 2015/0302064 A1* | 10/2015 | Knobloch | H04L 67/2823 707/722 |
| 2015/0348090 A1* | 12/2015 | Alsina | G06O 30/0244 705/14.43 |
| 2016/0027045 A1* | 1/2016 | Kurian | G06F 17/30528 705/14.49 |
| 2016/0170622 A1* | 6/2016 | Ladd | G06F 9/451 715/771 |
| 2016/0196588 A1* | 7/2016 | Wei | G06Q 30/0277 705/14.73 |
| 2016/0307229 A1* | 10/2016 | Balasubramanian | G06F 9/542 |

\* cited by examiner

PRESENTATION OF MEDIA CONTENT BASED ON COMPUTING DEVICE CONTEXT

TECHNICAL FIELD

The present technology pertains to presenting media content, such as invitational content, at a computing device, and more specifically pertains to intelligently selecting media content based a computing device context.

BACKGROUND

Online advertising is widely used by advertisers to market their products via mobile devices. Given the widespread availability of mobile devices, online advertising can be an extremely effective way for advertisers to reach a wide mass of potential customers and induce numerous users to purchase their products. By targeting online users with effective mobile advertisements, advertisers can yield large financial returns from their online advertisements.

Many tools are currently available for advertisers to optimize the performance of an advertising campaign. For example, advertisers can target a particular audience based on demographic information such as age, income, gender, level of education, occupation, etc. In addition, advertisers can target users according to the time of delivery for the advertisement and the geographic region.

The effectiveness of an online advertisement and the likelihood of a conversion depends largely on the attentiveness of the mobile user to the advertisement at the time the mobile advertisement is presented. However, in many cases, online advertisements are presented at a user's device without any knowledge of what other advertisements are being contemporaneously presented at the user's device. Consequently, a collection of different online advertisements may be presented to a user's device at any one time. The result is that, many advertisements, including those for which the advertiser has paid a premium, may be ignored or missed entirely by the user because the variation among collection of different online advertisements may distract the user from considering at least some of the advertisements being presented at the user's device. Accordingly, there is a need for managing the delivery and presentation of online advertisements to prevent the occurrence of these types of events.

SUMMARY

Additional features and advantages of the disclosure will be set forth in the description that follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Media content items can be delivered to different, active applications at a client device without any knowledge of other media content items being concurrently delivered to the client device. For example, advertisements from one advertiser can be provided in one active application and advertisements from another advertiser can be provided in another active application, even though the advertisements may be competing or conflicting. The approaches set forth herein can be used to intelligently select next media content for presentation on a device according to a present context of the device. In operation, the approaches set forth herein determine a context of a device based on at least media items presented at the device and filter the next media items to be presented based on this context. Such filtering can be provided based on media content previously received. A pre-defined context selected by a user or an application at the device, or any combination thereof. Thus, in the case of advertisements, a context defined by an advertisement being currently presented on the device can be used to identify and prevent other conflicting or competing advertisements from being presented as well. In the case of selection of a pre-defined context for the device, the device is effectively configured such that most or all advertisements at the device are limited to those of one or more select advertisers, thus providing a full takeover experience.

In operation, the approaches of the present technology can involve detecting that at least one media content presentation opportunity is available at a client device and generating a filter for the client device based on the present context of the client device. The present context of the client device can be determined based on the tags or information associated with the device, active applications on the device, or media content items presented at the device.

The filter can then consist of co-presentation rules associated with this present context. In some cases, these can be defined by tags associated with the device, applications, or media content items. Thereafter, the filter can be applied to a plurality of candidate media content items available for presentation at the client device to yield media content items compatible with the present context. Finally, the compatible media content items can be presented using the previously detected media content placement opportunities.

In the present technology, the co-presentations rules can be associated with any of a time criterion, an application priority criterion, a subject matter priority criterion, a media type priority criterion, a media item placement priority criterion, or a user engagement mode criterion. Further, the co-presentation rules can be categorized into at least exclusion and inclusion rules for media content items, such as a subject matter rule, a media type rule, or an interface element rule.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art to reduce the variation in media content items, such as advertisements or other invitational content, presented to users at a computing device. For example, in the case of a computing device concurrently running and/or displaying multiple applications, invitational content inserted into each of the applications may be from different advertisers, even when one or more of the advertisers has paid for premium placement. In some cases, the invitational content items may even possibly come from competing advertisers. Thus, an advertiser is unlikely to have the full attention of the user at the client device, which can lead to a lower likelihood of conversion of the invitational content. Worse, the user at the client device may select to convert the other advertiser's invitational content instead.

In many types of devices, this issue may be exacerbated by the "sandboxing" of applications. That is, in some devices, applications may be configured for operating independently from other applications, including the selection of invitational content items. Thus, there is a good probability of the occurrence of conflicting advertisements between "sandboxed" applications in devices that are concurrently running or displayed on a client device.

The disclosed technology addresses these types of problems by providing techniques for limiting the media content items presented at a client device according to the media content items presently and/or previously presented at the client device. In particular, the present technology is directed to systems, methods, devices, and non-transitory computer-readable storage media providing selection of media content items based on a context for a client device. The context for the device can be determined based at least on the media content items presently and/or previously presented at the client device.

Prior to discussing the present technology in detail, a brief introductory description of an exemplary configuration of devices and a network is disclosed herein. A detailed description of the various aspects of the present technology will then follow. These variations shall be described herein as the various embodiments are set forth.

Although the various embodiments may be illustrated at times with respect to the delivery of invitational content, such as advertisements, this is solely for ease of illustration. The present technology can be utilized to manage the delivery of any type of media content items, including audio items, image items, video items, alphanumeric items, or any combinations thereof.

Figure 1:
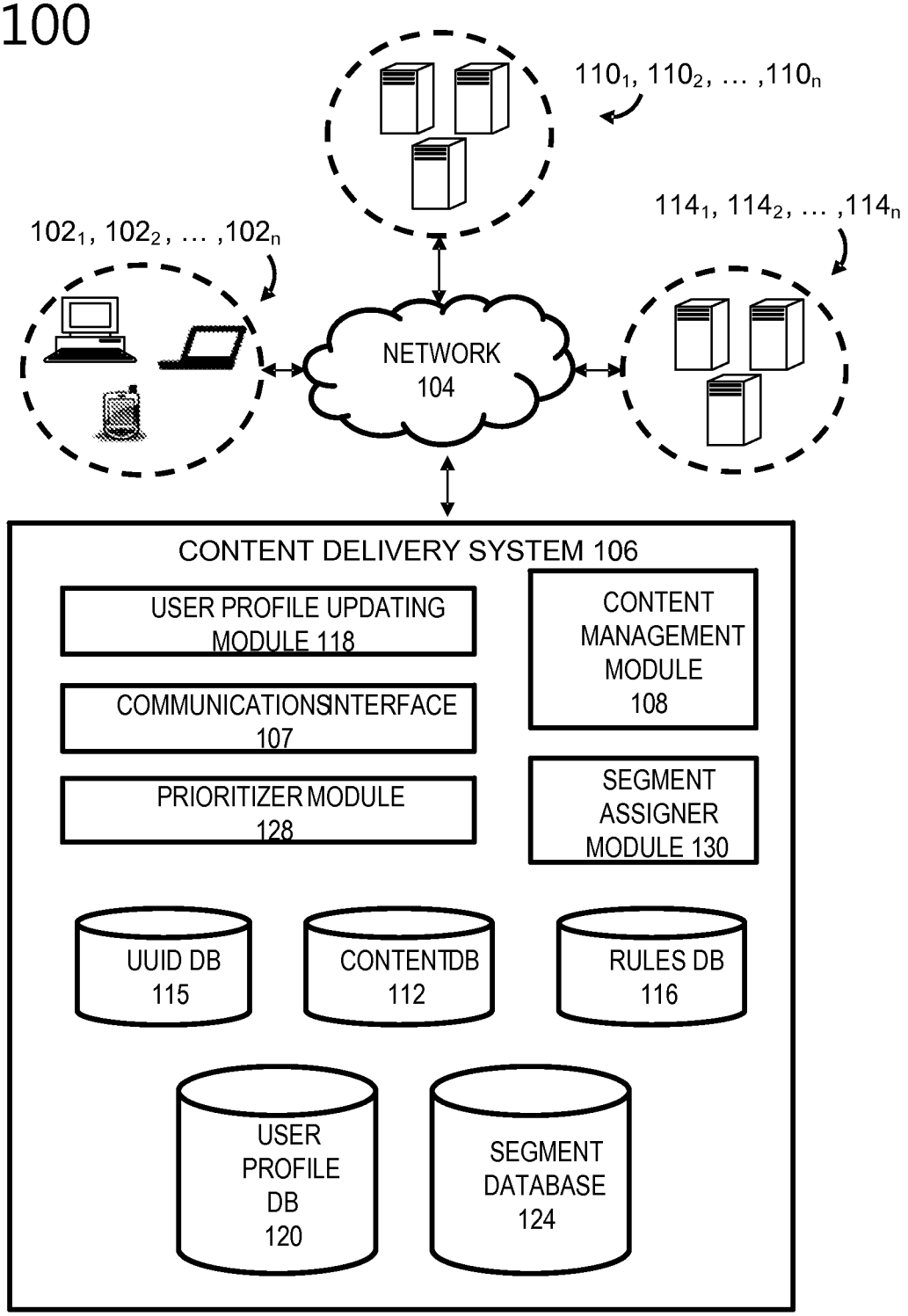
FIG. 1 illustrates an exemplary configuration of devices and a network.

An exemplary system configuration 100 is illustrated in FIG. 1, wherein electronic devices communicate via a network for purposes of exchanging content and other data. The system can be configured for use on a wide area network such as that illustrated in FIG. 1. However, the present principles are applicable to a wide variety of network configurations that facilitate the intercommunication of electronic devices. For example, each of the components of system 100 in FIG. 1 can be implemented in a localized or distributed fashion in a network.

In system 100, invitational content can be delivered to user terminals $102_1$, $102_2$, ..., $102_n$ (collectively "102") connected to a network 104 by direct and/or indirect communications with a content delivery system 106. User terminals 102 can be any network enabled client devices, such as desktop computers; mobile computers; handheld communications devices, e.g. mobile phones, smart phones, tablets; smart televisions; set-top boxes; and/or any other network enabled computing devices. Furthermore, content delivery system 106 can concurrently accept connections from and interact with multiple user terminals 102.

The content delivery system 106 can receive a request for electronic content, such as a web page, an application, a media item, etc., from one of user terminals 102. Thereafter, the content delivery system 106 can assemble a content package and transmit the assembled content page to the requesting one of user terminals 102. To facilitate communications with the user terminals 102 and/or any other device or component, the content delivery system 106 can include a communications interface 107.

The content delivery system 106 can include a content management module 108 to facilitate the generation of an assembled content package. Specifically, the content management module 108 can combine content from one or more primary content providers $110_1$, $110_2$, ..., $110_n$ (collectively "110") and content from one or more secondary content providers $114_1$, $114_2$, ... $114_n$ (collectively "114") to generate the assembled content package for the user terminals 102. For example, in the case of a web page being delivered to a requesting one of user terminals 102, the content management module 108 can assemble a content package by requesting the data for the web page from one of the primary content providers 110 maintaining the web page. For the invitational content on the web page provided by the secondary content providers 114, the content management module 108 can request the appropriate data according to the arrangement between the primary and secondary content providers 110 and 114. Additionally, the content management module 108 can create content packages that contain content from a single content provider. That is, a content package can contain only primary content or a content package can contain only secondary content. However, the content package is not limited to the content from content providers 110 and 114. Rather, the content package can include other data generated at the content delivery system 106.

In some embodiments, the content delivery system 106 can preselect the content package before a request is received. For example, the content delivery system 106 can be a broadcasting appliance that targets user terminals 102 within a localized geographic area or user terminals 102 that are part of network 104, such as a local area network or a personal area network. The content delivery system 106 can send the package to the user terminals 102 that have authenticated with network 104, without any individualized information used to target the particular user terminal 102.

An assembled content package can include text, graphics, audio, video, executable code, or any combination thereof. Further, an assembled content package can include invitational content designed to inform or elicit a pre-defined response from the user. In some embodiments, the invitational content can be associated with a product or can directly or indirectly advertise a product. For example, the assembled content package can include one or more types of advertisements from one or more advertisers.

Additionally, the invitational content can be active invitational content. That is, invitational content that is designed to primarily elicit a pre-defined response from a user. For example, active invitational content can include one or more types of advertisements configured to be clicked upon, solicit information, or be converted by the user into a further action, such as a purchase or a download of the advertised item. However, invitational content can also be passive invitational content. That is invitational content that is designed to primarily inform the user, such as a video. In some cases, passive invitational content can include information that can lead or direct users to other invitational content including active invitational content.

Furthermore, the invitational content can be dynamic invitational content. That is invitational content that varies over time or that varies based on user interaction. For example, dynamic invitational content can include an interactive game. However, the various embodiments are not limited in this regard and the invitational content can include static invitational content that neither varies over time nor with user interaction. In the various embodiments, invitational content in a content package can be static or dynamic and active or passive. A content package can include a combination of various types of invitational content in a single content package.

In some cases, a content package can replace or update invitational content in a content package already delivered to a user terminal. For example, a first content package can include an app that can be installed on the user terminal $102_i$. A subsequent content package can include one or more items of invitational content that can be presented to a user of the user terminal $102_i$ while the user interacts with the app.

Although primary and secondary providers 110 and 114 are presented herein as separate entities, this is for illustrative purposes only. In some cases, the primary and the secondary content providers 110 and 114 can be the same entity. Thus, a single entity can provide both the primary and the secondary content.

The content management module 108 can be configured to request that content be sent directly from content providers 110 and 114. Alternatively, a cached arrangement can also be used to improve performance of the content delivery system 106 and improve overall user experience. That is, the content delivery system 106 can include a content database 112 for locally storing/caching content maintained by content providers 110 and 114. The data in the content database 112 can be refreshed or updated on a regular basis to ensure that the content in the database 112 is up to date at the time of a request from a user terminal 102*i*. However, in some cases, the content management module 108 can be configured to retrieve content directly from content providers 110 and 114 if the metadata associated with the data in the content database 112 appears to be outdated or corrupted.

As described above, content maintained by the content providers 110 and 114 can be combined according to a predefined arrangement between the two content providers, which can be embodied as a set of rules. In an arrangement where the content delivery system 106 assembles the content package from multiple content providers, the assembly rules can be stored in a rules database 116 in the content delivery system 106. The content management module 108 can be configured to assemble the content package for user terminals 102 based on these rules. The rules can specify how to select content from secondary content providers 114 and primary content providers 110 in response to a request from one of user terminals 102. For example, in the case of a web page maintained by one of primary content providers 110 and including invitational content, the rules database 116 can specify rules for selecting one of the secondary providers 114. The rules can also specify how to select specific content from the selected one of secondary providers 114 to be combined with the content provided by one of primary providers 110. In some cases, an item of primary content, such as an app or other media object, can have one or more associated attributes. For example, an app can have one or more associated genre attributes, e.g. travel, sports, education, etc. A rule can be based at least in part on the primary content attributes. Once assembled, the assembled content package can be sent to a requesting one of user terminals 102.

Additionally, rules for combining primary and secondary content can be based on user characteristics known about the user. In particular, in some cases, invitational content can be selected based on the characteristics of the requesting user(s). As used herein, the term "user characteristics" refers to the characteristics of a particular user associated with one or more of user terminals 102. User characteristics can include channel characteristics, demographic characteristics, behavioral characteristics, and spatial-temporal characteristics. Channel characteristics can define the specific delivery channel being used to deliver a content package to a user. For example, channel characteristics can include a type of electronic content, a type of device or user terminal, a carrier or network provider, or any other characteristic that defines a specific delivery channel for the content package. Spatial-temporal characteristics can define a location, a location zone, a date, a time, or any other characteristic that defines a geographic location and/or a time for delivery of the content package. Demographic characteristics can define characteristics of the users targeted by the content or associated with the content. For example, demographic characteristics can include age, income, gender, occupation, or any other user characteristics. Behavioral characteristics can define user behaviors for one or more different types of content, separately or in combination with any other user characteristics. That is, different behavioral characteristics may be associated with different channel, demographic, or spatial-temporal characteristics. User characteristics can also include characteristics descriptive of a user's state of mind including characteristics indicative of how likely a user is to click on or convert an item of invitational content if it were displayed to the user. User characteristics can be learned directly or derived indirectly from a variety of sources. In some embodiments, the user characteristic values can be collected from one or more databases. For example, if the user is registered with an online media service, such as the ITUNES store maintained by Apple Inc. of Cupertino, Calif., the collected data could include the user's registration information. Such data can provide values for declared user characteristics. Furthermore, the content delivery system 106 can be configured to learn of or derive user characteristics from any number of other information sources. For example, in some configurations, the content delivery system 106 can derive or infer one or more user characteristic values from user characteristic values already known about the user.

In some embodiments, the interactive content can be associated with one or more targeted segments. A targeted segment can be viewed as defining a space or region in k-dimensional space, where each of the k dimensions is associated with one of a number of user characteristics. In the various embodiments, the k dimensions can include both orthogonal and non-orthogonal dimensions. That is, some of the k dimensions can overlap or can be related in some aspect.

In the various embodiments, the content delivery system 106 can also include a unique user identifier (UUID) database 115 that can be used for managing sessions with the various user terminal devices 102. The UUID database 115 can be used with a variety of session management techniques. For example, the content delivery system 106 can implement an HTTP cookie or any other conventional session management method (e.g., IP address tracking, URL query strings, hidden form fields, window name tracking, authentication methods, and local shared objects) for user terminals 102 connected to content delivery system 106 via a substantially persistent network session. However, other methods can be used as well. For example, in the case of handheld communications devices, e.g. mobile phones, smart phones, tablets, or other types of user terminals connecting using multiple or non-persistent network sessions, multiple requests for content from such devices may be assigned to a same entry in the UUID database 115. The content delivery system 106 can analyze the attributes of requesting devices to determine whether such requests can be attributed to the same device. Such attributes can include device or group-specific attributes.

In some embodiments, the content delivery system 106 can include a user-profile database 120. The user-profile database 120 can, at least in part, be constructed based on declared user characteristics related to one or more users. In some cases, the user-profile database may contain inferred or derived user characteristic values. The user-profile database 120 can be updated using a user-profile updating module 118. In some embodiments, the user-profile updating module 118 can be configured to add additional profile data, update profile data, fill in missing profile data, or infer user characteristic values from declared data.

The user-profile updating module 118 can also be configured to maintain the user-profile database 120 to include only more recently acquired data or to re-derive any inferred characteristics in order to ensure that the user profile is an accurate reflection of the current state of the user (location, state of mind, behaviors, demographics, etc. can change rapidly). For example, the user-profile updating module 118 can be configured to maintain the user-profile database 120 to include only data from the last two to three months. However, the user-profile updating module 118 can be configured to adjust the data in the user-profile database 120 to cover any span of time. In some instances the user-profile updating module 118 can update the profile database 120 in real-time. Alternatively, the user-profile updating module 118 can be configured to set an expiration period on a subset of the data in the user-profile database 120. For example, a policy can specify that user declared data is maintained as long as the user account is active, but user characteristic values based on location information expire after a specified period of time. In some cases, a user can set the expiration period. In some instances, the user-profile updating module 118 can update the user-profile database 120 at least every week, or every day. In some cases, the content delivery system 106 can receive a direct request to update one or more user profiles. The update request can come directly from the user's device or any other device capable of communicating with the content delivery system 106, such as other content delivery networks or websites. In some cases, the content delivery system 106 can receive an indirect request to update one or more user profiles. An indirect request can be the result of receiving new user characteristic values. An update request can occur at any time.

In some embodiments, the content delivery system 106 can include a segment database 124 that is used to aid in selecting invitational content to target to users. The segment database 124 can store defined segments and associations between the segments and users and/or invitational content that should be targeted to users associated with the segments. As described above, a targeted segment can be defined based on one or more user characteristics or derivatives thereof and can be associated with one or more items of invitational content. Additionally, a targeted segment can be associated with one or more users. In some embodiments, by associating a targeted segment with both a user and an item of invitational content, the delivery system can match invitational content with users. In some embodiments, the content delivery system 106 can update the segment database 124 to add newly defined targeted segments or to delete targeted segments.

In some cases a targeted segment can be as simple as a single user characteristic identifier and a single user characteristic value. For example, the common demographic identifiers of gender, age, occupation, or income can each be used in defining corresponding targeted segments. A characteristic value can also be assigned to the identifier. For example, the values of male, 19, and student can be assigned to the user characteristics of gender, age, and occupation, respectively. However, more complex targeted segments can also be defined that consist of one or more identifiers with one or more values associated with each identifier. For example, a targeted segment can be defined to target a user with the following characteristics: gender, male; age, 19-24; location, Northern California or New York City. Furthermore, targeted segments can correspond to one or more segments that content providers are likely to easily understand and thus can quickly identify as being relevant to their content. Additionally, in some embodiments, content providers 110 and 114 can define a custom targeted segment.

In some embodiments, the content delivery system 106 can provide a segment assigner module 130. The segment assigner module 130 can apply a set of user characteristics associated with a user (including segments to which a user has been previously assigned) to assign the user to one or more targeted segments. The assigner module 130 can obtain the set of user characteristic values from the user-profile database 120 and/or from the user's activities during the current session. The segment assigner module 130 can assign a user to one or more defined targeted segments in the segment database 124, or alternatively, a user can be assigned to a custom targeted segment defined to meet specific goals of a content provider.

Based on the assigned segments, the user-profile database 120 can be updated to reflect the segment assignments. Additionally, the content delivery system 106 can use the segment assignments to select targeted content. In some cases, the user profile data in the user-profile database 120 can change over time so the segment assigner module 130 can be configured to periodically update the segment assignments in the user-profile database 120. The segment assignment update can be triggered at specified intervals, upon detection of a change in the user-profile database 120, and/or upon detection of a specified activity in the content delivery system 106.

In some embodiments, the content delivery system 106 can provide a prioritizer module 128. The prioritizer module 128 can perform a variety of prioritizing tasks based on the configuration of the content delivery system 106. In some configurations, the prioritizer module 128 can prioritize the targeted segments assigned to a user. The prioritization can be influenced by a number of factors, which can include the user's context, a content provider's campaign goals, and/or the content that is currently available for display to the user. A request to prioritize the targeted segments can be explicit or implicit and can be made by any component of the system 100. For example, a secondary content provider 114 can explicitly request that the content delivery system 106 prioritize the targeted segments or the request can be implicit as part of a request for a content package. The resulting prioritized list can be provided, for example, to the content management module 108, which can then use the information to assemble and deliver a content package. Additionally, the prioritized list can be stored, for example in the user profile, for later use.

While the content delivery system 106 is presented with specific components, it should be understood by one skilled in the art, that the architectural configuration of system 106 is simply one possible configuration and that other configurations with more or less components are also possible.

One aspect of the present technology is the gathering and use of data available from various sources to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, or any other identifying information.

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

Now that some basic concepts have been set forth, the present disclosure turns to a more detailed description of the present technology. As discussed above, the present technology is directed to systems and methods to assess user engagement and select invitational content for delivery based on the user engagement. The following figures provide exemplary systems and methods for practicing the present technology.

Figure 2:
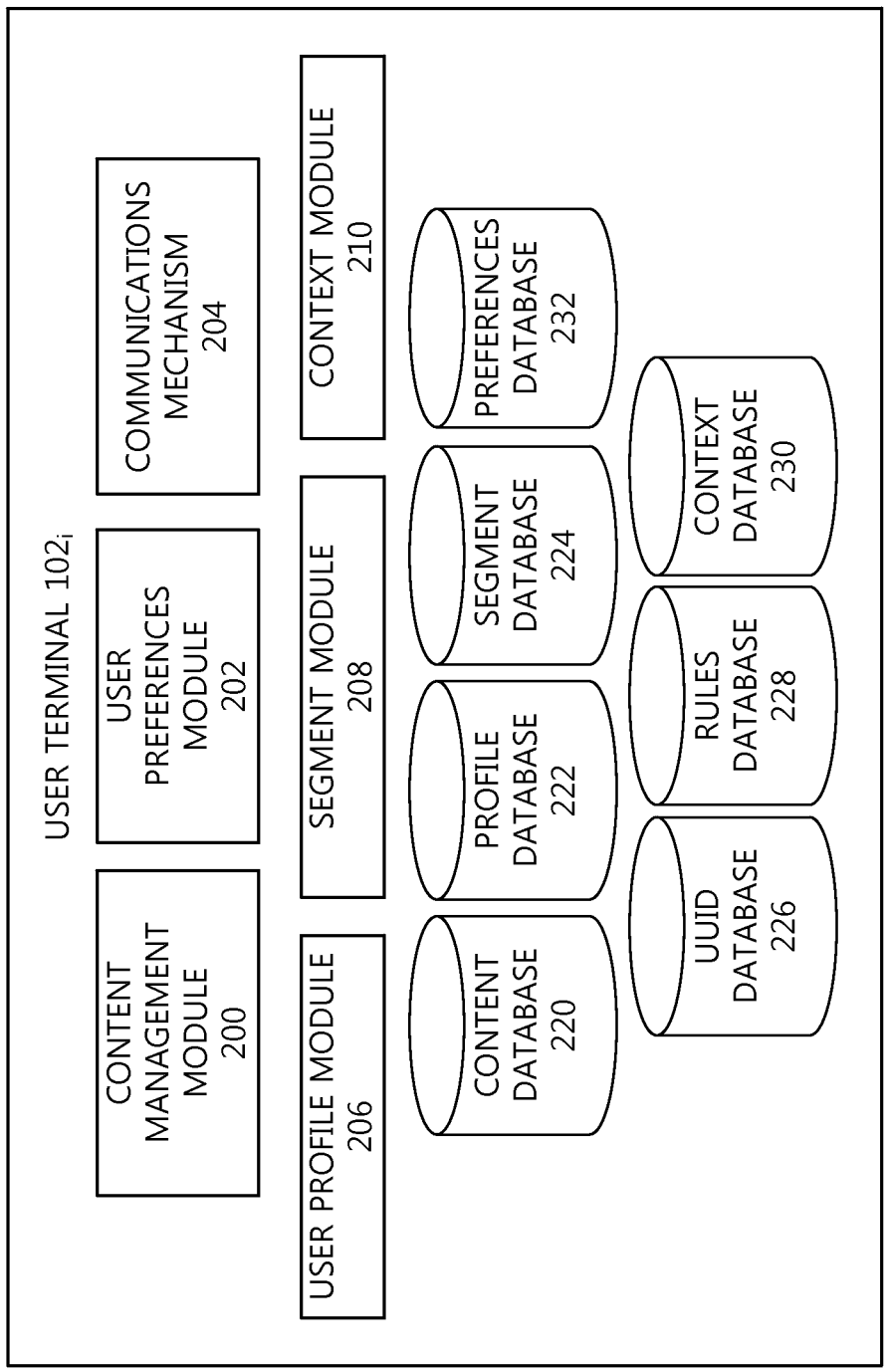
FIG. 2 illustrates an exemplary user terminal.

The disclosure now turns to FIG. 2, which illustrates an exemplary configuration of a client device. The client device, user terminal 102*i*, can include a content management module 200. The content management module 200 can manage and facilitate the generation and presentation of a content package. In some cases, the content management module 200 can combine content from local storage on the user terminal 102*i*, content delivery system 106, one or more primary content providers 110, and one or more secondary content providers 114, to generate or assemble a content package for the user terminal 102*i*. For example, in the case of a web page being delivered to user terminal 102*i*, the content management module 200 can assemble a content package by requesting the data for the web page from the content delivery system 106 or one of the primary content providers 110 maintaining the web page. For the invitational content on the web page provided by the secondary content providers 110, the content management module 200 can request the appropriate data according to the arrangement between the primary and secondary content providers 110 and 114. In some cases, the content management module 200 can request the appropriate data based on various parameters, conditions, rules, circumstances, or preferences at user terminal 102*i* or content delivery system 106.

Additionally, the content management module 200 can create content packages that contain content from a single content provider. That is, a content package can contain only primary content or a content package can contain only secondary content, for example. However, the content package is not limited to the content from content providers 110 and 114. Rather, the content package can include other data generated at the content delivery system 106 or user terminal 102*i*. For example, the user terminal 102*i* can include a content database 220 for locally storing/caching content maintained by user terminal 102*i*, content delivery system 106, or content providers 110 and 114. The data in the content database 220 can be refreshed or updated on a regular basis to ensure that the content in the database 220 is up to date at the time of a request from user terminal 102*i*. However, in some cases, the content management module 200 can be configured to retrieve content directly from content providers 110 and 114 if the metadata associated with the data in the content database 220 appears to be outdated or corrupted, for example.

In some embodiments, the content management module 200 can include content-listing functions. The content-listing functions can generate and/or maintain lists of content items, such as invitational content, that are estimated to be of interest to a user. The content-listing functions can also generate and/or maintain lists of places of interest for a user. The items in any particular list generated or maintained by the content-listing functions can be selected based on location data associated with the user terminal 102*i*, as well as context, profile, segment, or preferences information as further described below. For example, the content-listing functions can generate a specific list of items based on location data from user terminal 102*i*. The content-listing functions can also identify a geofence for the user terminal 102*i* based on the location data. The geofence can specify a geographic area or a perimeter, and the content-listing functions can identify and select items associated with the geographic area, for inclusion in a list of items. Thus, the list of items can include items specific to the geographic area. For example, the list of items can include advertisements for businesses located within the geographic area.

The content-listing functions can identify and/or select specific items to include in a list of items from one or more master lists of items or databases. For example, the content-listing functions can access a database containing all content items and search or filter the content items based on the determined geofence or user segment to identify and/or select those content items associated with a specific segment and geographic area or perimeter specified in the geofence. The content items in the master list or database can include associations with specific businesses, people, locales, entities, or locations to enable the content-listing functions to identify content items having specific associations. In some configurations, the content items can include metadata defining their respective associations to enable the content-listing functions to search and identify content items having specific associations, as previously described. Here, the metadata of the content items can also include additional information which can be used by the content-listing functions to search, filter, identify, order, or rank the content items. For example, the metadata can include a respective, unique identifier associated with the content item; the content item's association (e.g., the relationship or association defined for that particular content item); the identity of the content item's associated place or entity; etc. As another example, the metadata can include a tag, a description of the content item or its associated place, a location of the content in storage, a location of the place(s) associated with the content item, a rank of the content item and/or the place associated with the content item, a label, a URL, a preference, an identity, a status, a category, usage information, a configuration, a capability, a playback configuration, etc.

The content-listing functions can rank or order items in any specific list of items. For example, the content-listing functions can rank items based on their specific location relative to another location, such as a current location of user terminal 102*i*, a predicted location of the user terminal 102*i*, a location of a locale, a location of a third party, a location of other devices, an identity of the user and/or the user terminal 102*i*, an identity of a place or locale, a history, a popularity, etc. In addition, the content-listing functions can rank items based on other factors, such as current or future context, segment information, user information, statistical information, etc.

In some configurations, the content database 220 can maintain content items for presentation at the user terminal 102*i*. The content database 220 can also maintain content associations with specific places, such as locales. Moreover, the content database 220 can maintain a database corresponding to specific items of content. Further, metadata can specify unique identifiers, location information, association information, ranking information, etc. The content database 220 can also maintain lists of content items filtered or selected based on specific rules or criteria. For example, the content database 220 can maintain lists of content items that are relevant to specific geographic areas, demographics, segments, circumstances, etc. The content database 220 can maintain specific content items for presentation at user terminal 102*i*.

User terminal 102*i* can select and/or present one or more items of content from the content database 220 based on a request, a preference, a rule, a condition, etc. For example, user terminal 102*i* can select one or more content items for presentation based on a preference in the preferences database 232, context information in the context database 230, segment information in the segment database 224, rules from the rules database 228, profile information from the profile database 222, etc.

In some embodiments, the content delivery system 106 can preselect the content package before a request is received. Yet in other embodiments, the user terminal 102*i* can preselect the content package, a portion of a content package, or conditions for selecting a content package, and transmit a request to the content delivery system 106 or the content database 220 accordingly.

In addition, user terminal 102*i* can transmit a request for content to the content delivery system 106, where the request includes information to be used by the content delivery system 106 in selecting the content to be provided to user terminal 102*i*. Alternatively, the user terminal 102*i* or a particular application of user terminal 102*i*, for example, can create a request to content management module 200 for presentation of content, where the request includes information for selecting such content. Such information included in a request can include, among other things, location information, profile information, segment information, campaign information, user information, encrypted information, timing or delivery information, preferences, context information, device information, context information, rules, etc. In some embodiments, user terminal 102*i* can transmit location information to the content delivery system 106, which can assist the content delivery system 106 in selecting invitational content or a content package to be delivered to user terminal 102*i*. User terminal 102*i* can also obtain location information from one or more components of the device, and use that information to select one or more content items from the content database 220.

In other embodiments, user terminal 102*i* can transmit segment information that includes content tags to the content delivery system 106, to assist the content delivery system 106 in delivering targeted content to user terminal 102*i* based on the segment information and the content tags. Likewise, user terminal 102*i* can also obtain segment information that includes content tags from the segment database 224, and use that information to select one or more content items from the content database 220. The segment information in the segment database 224 can be generated by segment module 208 or otherwise obtained from a separate device, such as content delivery system 106.

The segment module 208 can apply a set of user characteristics associated with a user (including segments to which a user has been previously assigned) to assign the user to one or more targeted segments. The segment module 208 can obtain the set of user characteristic values from the user profile database 222, from the user's activities during the current session, from user activities in a user history, from the context database 230, etc. The segment module 208 can assign a user to one or more defined targeted segments in the segment database 224, or alternatively, a user can be assigned to a custom targeted segment defined to meet specific goals of a content provider or campaign. Furthermore, the segment module 208 can use the set of user characteristics to determine a user engagement mode.

Based on the assigned segments and the user engagement mode, the user profile database 222 can be updated to reflect the segment assignments. Additionally, the user terminal 102i can use the segment assignments to select targeted content from the content database 220 or to request content from a separate device, such as content delivery system 106. In some cases, the user profile data in the user profile database 222 can change over time so the segment module 208 can be configured to periodically update the segment assignments in the user profile database 222. The segment assignment update can be triggered at specified intervals, upon detection of a change in the user profile database 222, and/or upon detection of a specified activity in the user terminal 102i. In some cases, a user can be assigned to more than one segment, and each segment can be ranked or ordered. Moreover, segments in the segment database 224 can also be prioritized as described above in FIG. 1.

The context database 230 can store information associated with a user's current context. For example, the context database 230 can store the current application(s) or device usage information, browsing information, user activities, type(s) of content being consumed by the user, user location information, user or device state or status, user movement, device information, etc. In some cases, the context database 230 can also store information associated with a predicted context of a user, such as a future context at a specific day and/or time. For example, the context database 230 can store information defining a predicted location of the user at a future time or information associated with a predicted interest or state of the user at the future time. In some cases, the information in the context database 230 can be used to assign or prioritize segments as previously mentioned. The information in the context database 230 can also be used to select content from the content database 220 or a remote content database, request content from a remote device, rank content, assemble content, etc. In some cases, the information from the context database 230 can also be combined with information obtained from the preferences database 232, the rules database 228, the segment database 224, the profile database 222, etc., to assign or prioritize segments, select content from the content database 220 or a remote content database, request content from a remote device, rank content, assemble content, etc. Moreover, the context module 210 can collect, analyze, manage, modify, and store the context information in the context database 230. For example, the context module 210 can monitor or log user activities, and generate context information for storage in the context database 230.

User terminal 102i can also include a user preferences module 202. The user preferences module 202 can allow a user to customize user preferences to his or her needs, filter the amount and type of content to be received by a user at user terminal 102i, etc. In some cases, users may be given the opportunity to opt-in or opt-out of receiving specific types of advertising, such as proximity-based advertising, for example.

In some cases, users may edit settings specifying the manner in which user terminal 102i announces its presence to proximity-based advertising appliances. For example, the user preferences module 202 can be configured to allow a user to make user terminal 102i "invisible" to proximity-based advertising appliances. In another example, the user preferences module 202 can be configured to make user terminal 102i visible and also allow user terminal 102i to disclose its user engagement mode, thus allowing proximity-based advertising appliances to send customized or targeted invitational content items to user terminal 102i.

In some cases, users may set preferences specifying a distance that defines a maximum or minimum proximity to a targeted establishment. To this end, the users may specify that they wish to only receive content associated with establishments or entities located within a specific distance of the user's current or future location. Examples include 0.5 miles, 1 mile, 2 miles, and 5 miles. Users in densely populated areas, or who are walking through a mall with many stores in close proximity to each other, may opt for a much shorter proximity range, in order to avoid being inundated with content that is outside the scope of their walking or commuting proximity while at a given user location point. In some embodiments, automatic ranging based on location and/or density of content providers can also be provided, rather than a user manually adjusting the details of proximity distance.

In some cases, user preferences can include a taxonomy of offers that a user wishes to receive. This can indicate that only specific product and service categories should be received. The taxonomy can be a set of verticals, or markets in which vendors offer goods or services, that a user allows engagement with. For example, a user may decide to receive content related to fine dining restaurants and retail shopping, but not from entertainment venues or bars. Here, the user can specify these preferences within the user preferences module 202. In some embodiments, the taxonomy can become more granular and specific as a user visits specific places. For example, if a user has been demonstrated to visit or engage with invitational content from entertainment venues at a threshold frequency, the taxonomy can allow the user to specify additional user preferences for allowing or disallowing invitational content from nightclubs, sports arenas, concert halls, movie theaters, and the like. In this way, the taxonomy can be dynamic and can learn from past behavior or preferences, and can also zoom-in on the categories of interest to expand the options for the user. However, in some embodiments, the user may also be able to turn off the use or presentation of subcategories or the dynamic learning of the taxonomy.

User preferences can also be used to determine how often offers may be received by a user, and when those offers may be received. The user preferences module 202 can limit offer notifications to only be displayed during certain hours of the day. For instance, in one embodiment a user may specify that invitational content should only be broadcasted between 9 AM and 8 PM on any given day, or one or more specified days. In another embodiment, a user may specify that invitational content should be received when the user is present in his office building or in a commercial venue, for example.

Rate throttling can also be an additional consideration. For example, a user can specify that no more than a set number of offers should be broadcasted or delivered in a given span of time, or in total. To illustrate, the user can specify that only up to a maximum of 5 offers should be delivered to that user in a week. The throttling can also, in some case, be coupled with other settings such as frequency settings. For example, the user can specify that only a maximum of 5 offers should be delivered in a week, but each offer should be at least 5 minutes apart or, alternatively, each offer should be no more than 5 minutes apart.

In some embodiments, a user can choose to "blacklist" a particular invitational content provider from broadcasting to them. In additional embodiments, a user can specify that the same invitational content provider should not broadcast to the user again for a specified period of time, e.g., ten minutes, one hour, one day, etc.

The user profile module 206 can store the preferences in the user preferences database 232. The preferences in the user preferences database 232 can also be associated with user profiles stored in the profile database 222.

The profile database 222 can store any profile information created and stored by the user profile module 206. The profile information can include profiles created for one or more users, devices, or accounts. The profiles can include information such as, for example, a user name, a user ID, address information for the user, user preferences or a reference to user preferences stored elsewhere (e.g., user preferences database 222), a user alias, contact information, identifying information, or any other profile information according to conventional profile methods.

The UUID database 226 can also store a unique user ID representing a user. The unique user ID can represent a user profile in the profile database 222. In some cases, the unique user ID can be used to identify a user without disclosing private information about the user, such as the user's name or social security number, for example.

The information in the various databases can be communicated to the content delivery system 106 through the network 104. To facilitate communications with the content delivery system 106 and/or any other device or component, the user terminal 102i can include a communications interface 120.

In some cases, however, information is maintained at the user terminal 102i to protect the user's privacy. Moreover, certain information transmitted from user terminal 102i to a separate device, such as content delivery system 106, can be degraded, encrypted, or otherwise hidden or protected for privacy reasons. For example, to protect the user's privacy interest in his or her current location, user terminal 102i can ensure to obscure location information sent to content delivery system 106.

Moreover, information sent to a server, such as content delivery system 106, can be obscured, conceal, or encrypted in many ways. For example, a portion of the information sent to the server can be omitted in order to provide the server incomplete information so as to protect the precise information from being fully revealed. To illustrate, instead of sending the exact location of user terminal 102i, the location information can merely specify the vicinity, as opposed to exact coordinates, of user terminal 102i to protect the exact location of user terminal 102i. Thus, if the user associated with user terminal 102i is at church, for example, but does not want that information disclosed, the degraded location of user terminal 102i can omit such details by providing a vicinity of the user, which may not precisely place user terminal 102i at the church. As another example, strings or symbols representing particular information can be sent to a server in lieu of the actual information to conceal the actual information represented by such strings or symbols. In some embodiments, user terminal 102i can use strings or symbols to represent segments or users, and send such strings or symbols to the server instead of the actual information. For example, user terminal 102i can send to the server unique user IDs from the UUID database 226, instead of actual names or real identifying information, to conceal and protect the identity of users. As another example, user terminal 102i can send to the server a string representing a segment for targeting content to hide the actual segment represented by the string. Other methods of concealing or encrypting information are also contemplated herein; however, these are provided as examples for the sake of clarity.

Figure 3:
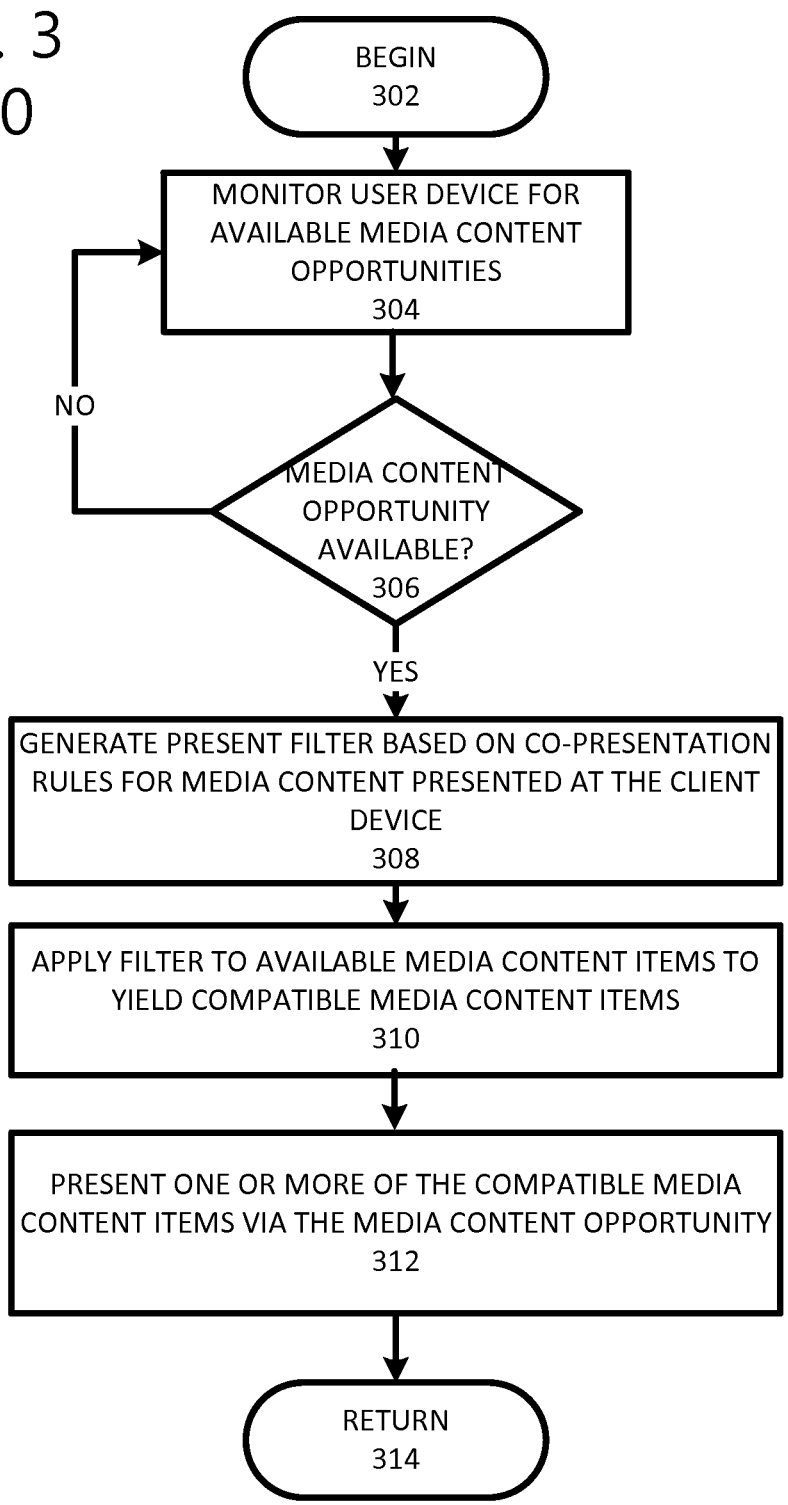
FIG. 3 illustrates an exemplary method embodiment.

Turning now to FIG. 3, an operation of the process for selecting media content for a user device in accordance with the present technology will be discussed in further detail. FIG. 3 is a flowchart of steps in an exemplary method 300 for selecting media content items for presentation at a user device based on a context at the user device defined by present and/or previous media content items presented at the user device.

Method 300 begins at step 302 and continues to step 304. At step 304, the user device, an example of which is user terminal 102i, commences monitoring the user device for any opportunities for presenting media content.

For example, the media content opportunities detected can be opportunities for presenting invitational content, such as advertisements or the like. In a particular example, an application at the user device can be configured to include opportunities for presenting invitational content in the form of a banner advertisements, a text-only advertisement, an image/video advertisement, audio advertisements, or any combination thereof. Such media content opportunities can be within the application itself or as part of another application to be launched to present.

In operation, contemporaneously with (i.e., during or just before) the presentation of an application including an opportunity, or portions thereof, the user device can identify the availability of such opportunities within the application. This can be achieved in a variety of ways. In some configurations, the opportunities can be detected based on requests from the application for content. For example, the content management module 200 can identify such opportunities based on requests from the application. In other configurations, the application can be configured to provide notifications or other messages, prior to actual requests for media content, indicating potential or future opportunities for media content, such as invitational content. In still another configuration, the user device can include a module or component, such as content management module 200 or other component in user terminal 102i, can be configured for scanning or analyzing the various applications in use and identifying present and/or future opportunities for presenting media content.

It is contemplated that the detection at step 304 includes not only detection of the existence of the opportunity, but additional details associated with the opportunity for selecting the appropriate type of media content for the opportunity. For example, in the case of detecting an opportunity for presenting an item of invitational content, the detection can involve determining whether the opportunity involves one of a banner advertisement opportunity, a text-only advertisement opportunity, an image/video advertisement opportunity, an audio advertisement opportunity, or other type of advertising opportunity.

In some configurations, this detection process can involve the transferring or generating of metadata describing the opportunity. For example, in some configurations, the applications can include metadata describing such opportunities and the metadata can be then utilized to detect the opportunities. In other configurations, such metadata can be generated during the detection process based on other information from the application, such as a request from an application for a invitational content item.

After the monitoring begins at step 304, a determination is made at step 306 as to whether or not an opportunity is available. These can be present opportunities, future opportunities, or both. In the absence of an opportunity, the method 300 returns to step 304 to continue monitoring. If an opportunity is present at step 306, the method continues on to step 308.

At step 308, a filter is generated based on co-presentation rules corresponding to a present context. Accordingly, step 308 involves ascertaining a present context of the device, in terms of characteristics of the device, active applications, and/or media content presented. Then, using the co-presentation rules corresponding to the device, the active applications on the device, and/or media content presented at the device, presently and/or previously, a filter is generated that identifies the characteristics of media content that will be allowed to be presented at the device. Thus, the filter is configured to identify selection criteria, based on the present context of the device, to select media content for the user device. Various types of selection criteria can be defined, including and not limited to: presentation time criteria, an application priority criteria, a subject matter priority criteria, a media type priority criteria, a media item placement priority criteria, or a user engagement mode criteria.

Moreover, the filter can also be configured to select media content based on the type of media content opportunities. For example, in the case of a banner advertisement or other specific type of media content opportunity, the filter can exclude other types of media content.

As noted above, co-presentation rules can be associated with any of a device, an application, or a media content item. Further, each of the co-presentation rules can include at least exclusion rules or inclusion rules. The exclusion and inclusion rules can specify allowed inclusion or exclusion of media content based on presentation time, an application priority, a subject matter priority, a media type priority, a media item placement priority, a user engagement mode, device events, application events, or any combination thereof. However, the present disclosure contemplates that the inclusion or exclusion rules can also be based on additional factors not listed above.

The present disclosure contemplates that it is highly likely that in some cases, the co-presentation rules corresponding to a device, applications at the device, or media content presented at the device can conflict with each other. Accordingly, the present disclosure contemplates providing a set of hierarchy rules at the device to indicate which co-presentation rules are superseded by others. The provided hierarchy rules can also specify any number of exceptions to the main hierarchy rules.

In some configurations, the hierarchy rules can be the same or different across all types of devices. For example, a main or default set of hierarchy rules can be provided for all types of devices. In the case where differing hierarchies are need for different devices, the exceptions in the hierarchy rules can be device specific. Alternatively, the exceptions can be application specific, such that it is the applications on the device that determine what exceptions to follow. In yet other cases, the exceptions can be media item specific, such that it is the media items on the device that determine what exceptions to follow. Additionally, any combination of these is also possible. In such a configuration, the hierarchy rules can also be configured to specific how to manage conflicts between different exceptions.

The co-presentation rules discussed above can be provided at the device in a variety of ways. In some particular embodiments, the co-presentation rules can be provided by or generated from a set of tags associated with a device, an application, or a media items. An illustrative example of provisioning of such tags in a device is illustrated with respect to FIG. 4.

Figure 4:
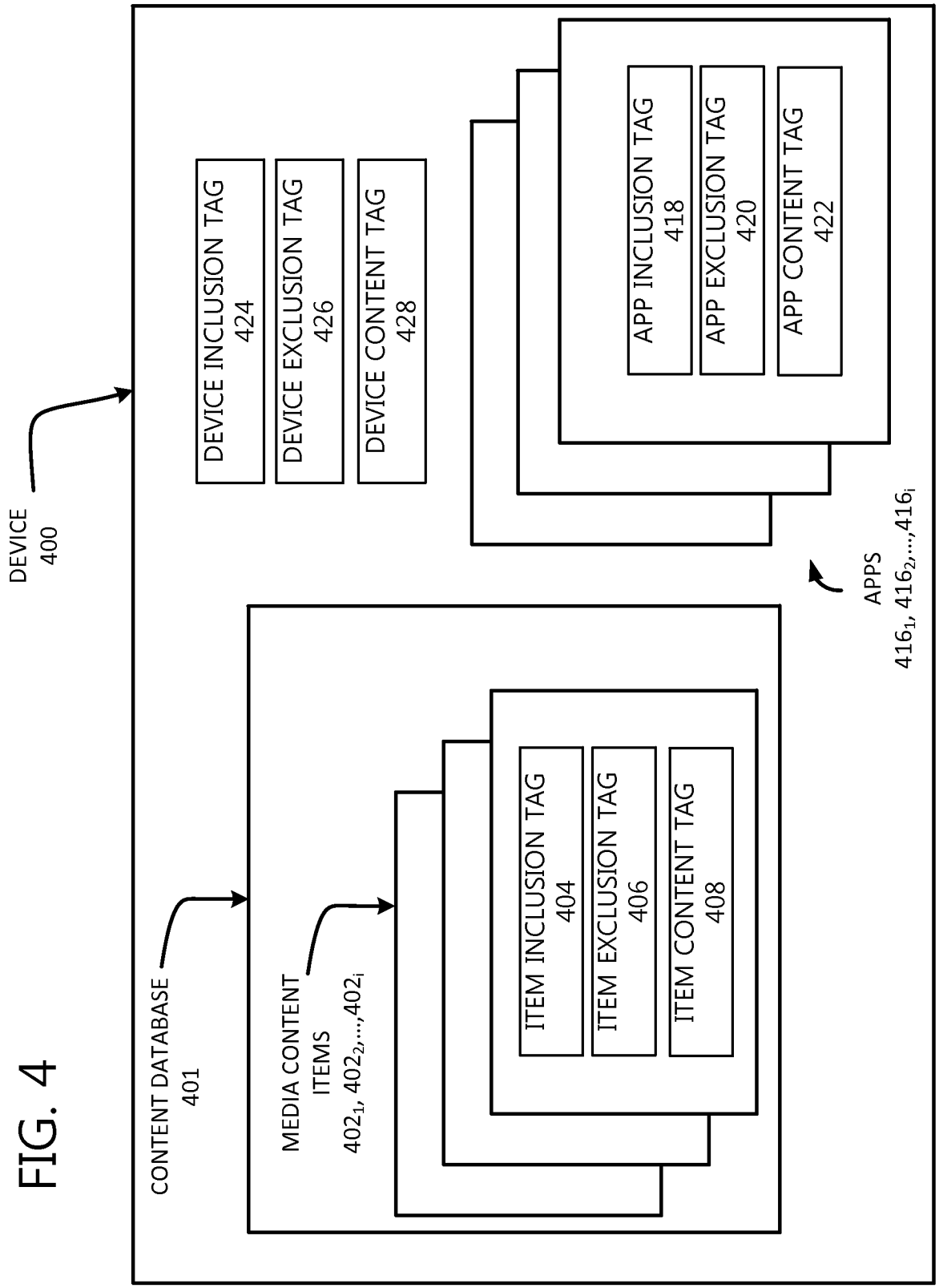
FIG. 4 illustrates an exemplary user device embodiment.

FIG. 4 shows an exemplary device 400 configured in accordance with the present technology. Device 400 can include a set of media content items $402_1$, $402_2$ . . . $402_i$ (collectively 402) stored in a content database 401. The media content items 402 can be delivered to device 400 by a content delivery system or other system and stored for immediate or later use, as described above with respect to FIG. 1. As shown in FIG. 4, media content items 402 can each include any of at least one inclusion tag 404, at least one exclusion tag 406, or at least one content tag 408. The inclusion tag 404 can include one or more inclusion rules or one or more inclusion criteria associated with presenting media content item 402. For example, inclusion tag 404 can include a parameter requiring the client device 410 to allow presentation of any other media content associated with a particular subject matter when the media content item is presented. Likewise, exclusion tag 406 can include one or more exclusion rules or one or more criteria associated with preventing the presentation of media content items. For example, the exclusion tag 406 can include a parameter that inhibits presentation of any other media content item associated with a particular subject matter when the invitation content item is presented. Media content item 402 can also include content tag 408. Content tag 408 can include additional information about the substance of the media content item. For example, content tag 408 can indicate a subject matter of the media content item or any other characteristics of the invitational content item.

However, as shown in FIG. 4, tags are not limited to media content items 402. The present disclosure contemplates that tags can also be provided on an application level. For example, as shown in FIG. 4, device 400 can include a set of applications $416_1$, $416_2$ . . . $416_i$ (collectively 416). One or more of these applications 416 can also include any of at least one inclusion tag 418, at least one exclusion tag 420, or at least one content tag 422. These tags can provide rules or criteria in a similar fashion as tags 404-408, but from the perspective of the application. For example, providing certain inclusions or exclusions based on the status of the application, events at the application, or even the status or events associated with co-occurring applications.

The present disclosure further contemplates that tags can be provided on a device level. For example, as shown in FIG. 4, device 400 include any of at least one inclusion tag 424, at least one exclusion tag 426, or at least one content tag 428. These tags can provide rules or criteria in a similar fashion as tags 404-408, but from the perspective of the device. For example, providing certain inclusions or exclusions based on the status of the device, events at the device, or even the status or events associated with other devices in communication with the device.

The present disclosure also contemplates that tags associated with a device, an application, or a media content item need not line up with the actual device, application, or media content item. That is, the exclusion or inclusion tags can define rules that operate irrespective of the actual content of the media content item. In some cases, the exclusion or inclusion tags may even define rules that are contrary to or in conflict with the media content item. Such a configuration can be useful in certain cases, such as with invitational content items. In such cases, it may not be feasible to create a new invitational content item in the middle of a campaign, but exclusions and inclusions can be enforced by adjustment of the tags. Such adjustments can be made via the content delivery system or communicated directly to the client device.

Although certain types of tags have been described above, the present technology is not limited in this regard. In certain embodiments, any other types of tags can be provided at the device, application, or media content item level.

Further, in the case of invitational content items, the present disclosure contemplates that a provider of such items can be required to pay a premium cost in order to include tags that exclude competitors' media content items. In some instances, the provider can implement a "takeover" of the device so that most or all media content items presented at the device are associated with the provider and/or one of its affiliates. This can be accomplished via inclusion of appropriate tags with media content items being delivered or inclusion or appropriate tags in an application affiliated with the provider. In some instances, the provider may even pre-install the appropriate tags at a device level. For example, a "sponsor" can provide an ad-supported device or a themed device via inclusion of device tags when the device is provided to a user. The "sponsor" of the device can be locked (i.e., the device tags are irrevocable or permanent) in some configurations so that advertisements are always affiliated, at least in part, with the sponsor or affiliates thereof. In other configurations, the device tags can be maintained until a pre-defined condition is met, such as an expiration of time, a qualifying conversion(s) of an advertisement from the sponsor and/or any of its affiliates, or any other criteria. In another instance, a subsequent installation of the appropriate tags at a device level can be provided. For example, premium content of an application can be unlocked if a user permits the installation of device-level tags. Such premium content can remain unlocked until a pre-defined condition is met, such as an expiration of time, a qualifying conversion(s) of an advertisement from the sponsor and/or any of its affiliates, or any other criteria.

Moreover, the present disclosure contemplates that a provider of such items can be required to pay a premium cost in order to include tags that define inclusion rules to prevent their advertisements from being blocked by other tags. In other words, an advertiser can be charged a premium for allowing any tags that provide an advantage or exclusivity to an advertiser at the device. In some configurations, the present disclosure contemplates that the device can be configured to monitor for such events and to communicate with a content delivery system, such as content delivery system 106 in FIG. 1, charge an advertiser for the occurrence of such advantageous events or periods of exclusivity.

Referring back to FIG. 3, the generating at step 308 involves collecting the relevant tags and formulating a set of rules for selecting additional media content to present at the device. The relevant tags can be collected in a variety of ways. In one configuration, the tags can be associated with a present use of the device. That is, the present status or configuration of the device, the active applications, and/or the media content items being presented. Thereafter, the tags associated with the present status can be and combined, according to any hierarchy rules, to formulate the co-presentation rules and generate the filter.

In some configurations, the tags need not be limited to those associated with current activities. Rather, a window of time can be identified and tags can be selected that correspond to the status or configuration for a window or period of time. In such configurations, the window of time can be selected in a variety of ways. In some cases, the time window can be pre-defined or static. In other cases, the time window can be dynamically adjusted. Such adjustments can be based on the characteristics or usage of applications or media content items presented at the device.

Moreover, the window of time can also be provided in a variety of ways. In some configurations, the window of time can be specified at the device and optionally in the device tags. In other configurations, the window of time can be defined in the application and/or media content item tags. In the cases where multiple windows of time are defined, the hierarchy rules can also specify how to select from among the different time windows. In some cases, the time window can be computed. For example, in the case where different time windows are provided via tags or other information, these time windows can be combined in a pre-defined fashion to compute the time window to be used. Such a pre-defined scheme can be defined, for example, in the hierarchy rules or in the tags. Any different types of schemes can be provided. For example, a weighting scheme can be used to weight time windows from certain tags greater than other time windows.

In some configurations, the time window can also be tied to a level of user engagement with the device, an application, or a media content item. Thus, depending on the level of user engagement, the window can be increased or decreased. For example, if the media content items are advertisements and a user is one that is of particular interest to an advertiser, the advertisements may include tags that exclude other advertiser's advertisements for a long period of time. In contrast, if the user is not of particular interest to an advertiser, the advertisement may instead provide a short time window. As noted, above, advertisers can be charged a premium depending on the exclusivity being attempted via the time window defined in their tags.

Referring back to FIG. 3, once the filter is generated at step 308, the filter can be applied at step 310 to select media content items from a list of available content items, resulting in a set of compatible content items. The present disclosure contemplates that step 310 can be performed in a variety of ways. In some configurations, media content items can be stored on the device, such as at content database 220 in FIG. 2. As the filter is applied and a compatible media content item is identified, the compatible media content item can be transferred to a storage location on the device. Alternatively, such items can be marked as compatible, either directly in the item or elsewhere on the device. In other configurations, the filtering process can cause the deletion of incompatible media items from the device. The present disclosure also contemplates that all or some of the media content items for the device can be stored remotely. In such configurations, the filtering process can result in the transferring of compatible items to the device or the marking of compatible items on the remote device. In some configurations, this can also result in the deletion of items from the remote device. In still other configurations, the media content items, whether stored locally or remotely, can remain undisturbed. In these cases, if a queue for media content items is being maintained, any markings or deletions can be performed on the queue. Alternatively, a new queue can be generated based on the filter.

After the compatible media content items are identified at step 310, the method 300 can proceed to step 312. At step 312, the compatible media content items can then be presented at the device.

The present disclosure contemplates that in some configurations, the number of compatible media content items may be insufficient to provide sufficient media content items for the available opportunities. In some configurations, this can be addressed by providing a pre-defined placeholder object. In other configurations, a non-compatible item can be provided instead. In some cases, the non-compatible item can be selected based on the generated filter, where non-compatible items are selected if they meet a portion of the criteria set forth by the filter. The portion required can be fixed. However, in some cases, the portion required can vary depending on the number of opportunities available.

The present disclosure contemplates that the selection of non-compatible items can be performed at steps 310 or 312. At step 310, the filter can include in the compatible items, a number of the non-compatible items based on the number and types of opportunities detected at step 306. At step 312. he non-compatible items can be selected if no compatible items exist for a particular opportunity.

Once the media content items are selected and presented at step 312, the method 300 proceeds to step 314 to resume previous processing, including repeating method 300.

The present disclosure contemplates that in some configurations the performing of method 300 can be optional, based on the present context. For example, if the device is associated with a low level of user engagement (e.g., while a smartphone is charging overnight) or is in a mode associated with low levels of user engagement (e.g., while driving), the method 300 may not be performed at all for selecting invitational content, since the user is not paying attention to any invitational content anyways.

Figure 5A:
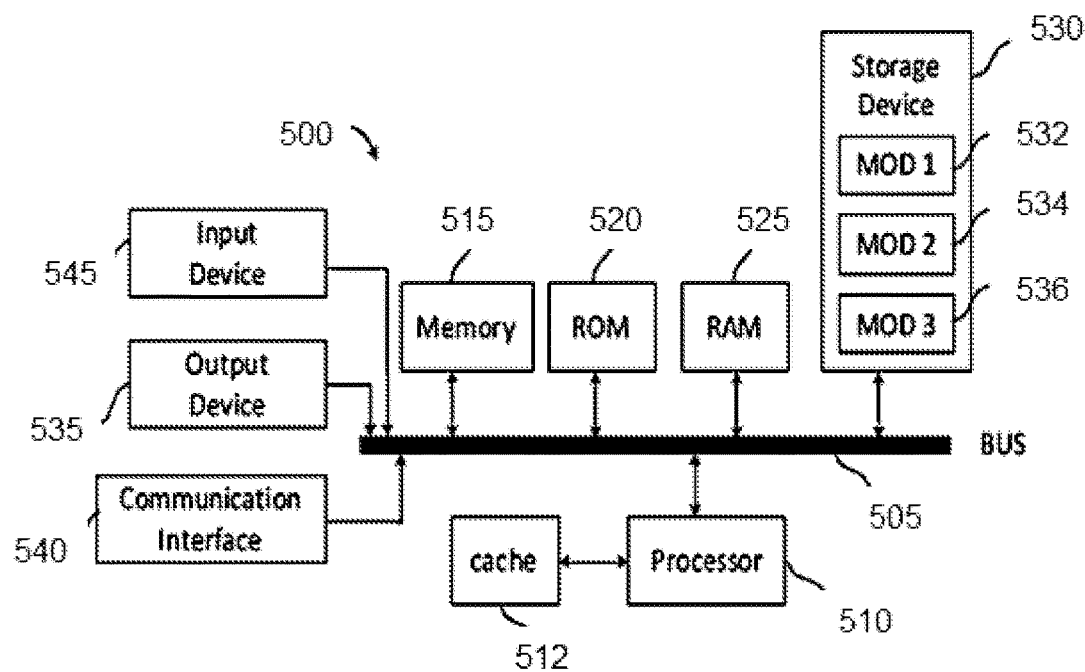
FIG. 5A and FIG. 5B illustrate exemplary system embodiments.

FIG. 5A illustrates a conventional system bus computing system architecture 500 wherein the components of the system are in electrical communication with each other using a bus 505. Exemplary system 500 includes a processing unit (CPU or processor) 510 and a system bus 505 that couples various system components including the system memory 515, such as read only memory (ROM) 520 and random access memory (RAM) 525, to the processor 510. The system 500 can include a cache of high-speed memory connected directly with, in close proximity to, or integrated as part of the processor 510. The system 500 can copy data from the memory 515 and/or the storage device 530 to the cache 512 for quick access by the processor 510. In this way, the cache can provide a performance boost that avoids processor 510 delays while waiting for data. These and other modules can control or be configured to control the processor 510 to perform various actions. Other system memory 515 may be available for use as well. The memory 515 can include multiple different types of memory with different performance characteristics. The processor 510 can include any general purpose processor and a hardware module or software module, such as module 1 532, module 2 534, and module 3 536 stored in storage device 530, configured to control the processor 510 as well as a special-purpose processor where software instructions are incorporated into the actual processor design. The processor 510 may essentially be a completely self-contained computing system, containing multiple cores or processors, a bus, memory controller, cache, etc. A multi-core processor may be symmetric or asymmetric.

To enable user interaction with the computing device 500, an input device 545 can represent any number of input mechanisms, such as a microphone for speech, a touch-sensitive screen for gesture or graphical input, keyboard, mouse, motion input, speech and so forth. An output device 535 can also be one or more of a number of output mechanisms known to those of skill in the art. In some instances, multimodal systems can enable a user to provide multiple types of input to communicate with the computing device 500. The communications interface 540 can generally govern and manage the user input and system output. There is no restriction on operating on any particular hardware arrangement and therefore the basic features here may easily be substituted for improved hardware or firmware arrangements as they are developed.

Storage device 530 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 525, read only memory (ROM) 520, and hybrids thereof.

The storage device 530 can include software modules 532, 534, 536 for controlling the processor 510. Other hardware or software modules are contemplated. The storage device 530 can be connected to the system bus 505. In one aspect, a hardware module that performs a particular function can include the software component stored in a computer-readable medium in connection with the necessary hardware components, such as the processor 510, bus 505, display 535, and so forth, to carry out the function.

Figure 5B:
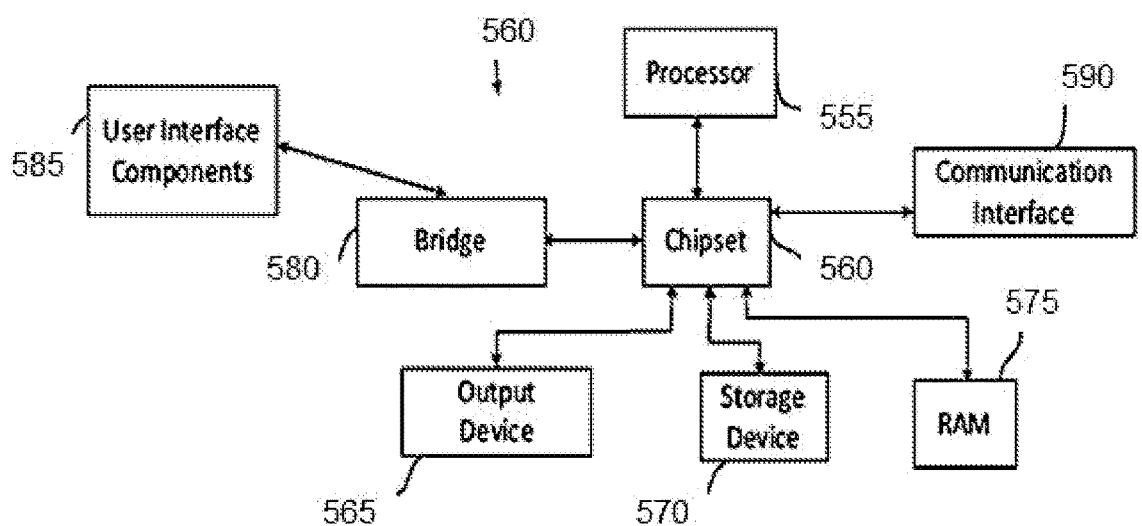

FIG. 5B illustrates a computer system 550 having a chipset architecture that can be used in executing the described method and generating and displaying a graphical user interface (GUI). Computer system 550 is an example of computer hardware, software, and firmware that can be used to implement the disclosed technology. System 550 can include a processor 555, representative of any number of physically and/or logically distinct resources capable of executing software, firmware, and hardware configured to perform identified computations. Processor 555 can communicate with a chipset 560 that can control input to and output from processor 555. In this example, chipset 560 outputs information to output 565, such as a display, and can read and write information to storage device 570, which can include magnetic media, and solid state media, for example. Chipset 560 can also read data from and write data to RAM 575. A bridge 580 for interfacing with a variety of user interface components 585 can be provided for interfacing with chipset 560. Such user interface components 585 can include a keyboard, a microphone, touch detection and processing circuitry, a pointing device, such as a mouse, and so on. In general, inputs to system 550 can come from any of a variety of sources, machine generated and/or human generated.

Chipset 560 can also interface with one or more communication interfaces 590 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 555 analyzing data stored in storage 570 or 575. Further, the machine can receive inputs from a user via user interface components 585 and execute appropriate functions, such as browsing functions by interpreting these inputs using processor 555.

It can be appreciated that exemplary systems 500 and 550 can have more than one processor 510 or be part of a group or cluster of computing devices networked together to provide greater processing capability.

For clarity of explanation, in some instances the present technology may be presented as including individual functional blocks including functional blocks including devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Claim language reciting "at least one of" a set indicates that one member of the set or multiple members of the set satisfy the claim. Tangible computer-readable storage media, computer-readable storage devices, or computer-readable memory devices, expressly exclude media such as transitory waves, energy, carrier signals, electromagnetic waves, and signals per se.

We claim:

1. A computer-implemented method comprising:
   determining that a first media content item was inserted into a first application executing at a client device, wherein the first media content item is associated with a tag;
   detecting that at least one media content presentation opportunity is available for a second media content item to be inserted into a second application executing at the client device, the second application operating independently from the first application;
   determining at least the tag associated with the first media content item;
   generating one or more co-execution rules for selecting a compatible media content item for the at least one media content presentation opportunity while the first application and the second application are concurrently executing on the client device, the co-execution rules defining non-compatible tags, wherein media content items with non-compatible tags cannot be displayed in the first application and the second application during a period of time defined by the co-execution rules;
   selecting the at least one compatible media content item as the second media content item based on the one or more co-execution rules; and
   based on the selection, inserting the second media content item into the second application via the at least one media content presentation opportunity.

2. The computer-implemented method of claim 1, wherein the present context is based on one or more media content items presented at the client device, and wherein the generating comprises:
   determining that a third media content item was inserted into the first application executing at a client device;
   combining the co-execution rules associated with the first media content item and the third media content item inserted into the first application to yield the present context filter; and
   selecting the second media content item presented at the client device based on the selection criteria based on the combined co-execution rules.

3. The computer-implemented method of claim 2, wherein the selection criteria comprises at least one of a presentation time criterion, an application priority criterion, a subject matter priority criterion, a media type priority criterion, a media item placement priority criterion, or a user engagement mode criterion.

4. The computer-implemented method of claim 1, wherein the applying comprises:
   comparing the co-execution rules of the present context filter with each of the plurality of candidate media content items; and
   filtering each of the plurality of candidate media content items according to the comparison.

5. The computer-implemented method of claim 4, wherein the co-execution rules comprise at least one of an inclusion rule or an exclusion rule.

6. The computer-implemented method of claim 4, wherein the co-execution rules comprise at least one of a subject matter rule, a media type rule, or an interface element rule.

7. The computer-implemented method of claim 1, wherein the at least one media content presentation opportunity is available at a first application at the client device; and
   wherein the second media content item presented at the client device are associated with a second application at the client device.

8. A computer-implemented method comprising:
- determining that a first media content item was inserted into a first application executing at a client device, wherein the first media content item is associated with a tag;
- detecting that at least one media content presentation opportunity is available for a second media content item to be inserted into a second application executing at the client device, the second application operating independently from the first application;
- determining at least the tag associated with the first media content item;
- generating one or more co-execution rules for selecting a compatible media content item for the at least one media content presentation opportunity while the first application and the second application are concurrently executing on the client device, the co-execution rules defining non-compatible tags, wherein media content items with non-compatible tags cannot be displayed in the first application and the second application during a period of time defined by the co-execution rules;
- selecting at least one compatible media content item as the second media content item from a plurality of candidate media content items available for presentation at the client device, the selection based in part on the non-compatible tags; and
- based on the selection, inserting the second media content item into the second application via the at least one media content presentation opportunity.

9. The computer-implemented method of claim 8, wherein the present context is based on one or more media items presented at the client device, and wherein the identifying comprises:
- determining that a third media content item was inserted into the first application executing at a client device;
- combining the co-execution rules associated with the first media content item and the third media content item inserted into the first application to yield a present context filter; and
- selecting the second media content item presented at the client device based on the selection criteria based on the combined co-execution rules.

10. The computer-implemented method of claim 9, wherein the selection criteria comprises at least one of a presentation time criterion, an application priority criterion, a subject matter priority criterion, a media type priority criterion, a media item placement priority criterion, or a user engagement mode criterion.

11. The computer-implemented method of claim 8, wherein the present set of tags specifies at least one of an exclusion rule or an inclusion rule, and wherein the selecting comprises:
- comparing the present set of tags with each of the plurality of candidate media content items; and
- filtering each of the plurality of candidate media content items according to the comparison.

12. The computer-implemented method of claim 11, wherein each of the exclusion rule and the inclusion rule comprise at least one of a subject matter rule, a media type rule, or an interface element rule.

13. The computer-implemented method of claim 8, further comprising:
- predicting a set of future tags based on a history of presentation of context at the client device;
- applying a set of present tags and the set of future tags to the plurality of candidate media content items to identify one or more incompatible media content items; and
- removing the incompatible media content items from the plurality of candidate media content items.

14. A client device, comprising:
- a communications interface;
- a processor; and
- a computer-readable medium, having stored thereon a plurality of instructions for causing the processor to perform operations comprising:
  - determining that a first media content item was inserted into a first application executing at a client device, wherein the first media content item is associated with a tag;
  - detecting that at least one media content presentation opportunity is available for a second media content item to be inserted into a second application executing at the client device, the second application operating independently from the first application;
  - determining at least the tag associated with the first media content item;
  - generating one or more co-execution rules for selecting a compatible media content item for the at least one media content presentation opportunity while the first application and the second application are concurrently executing on the client device, the co-execution rules defining non-compatible tags, wherein media content items with non-compatible tags cannot be displayed in the first application and the second application during a period of time defined by the co-execution rules;
  - selecting the at least one compatible media content item as the second media content item based on the one or more co-execution rules; and
  - based on the selection, inserting the second media content item into the second application via the at least one media content presentation opportunity.

15. The client device of claim 14, wherein each of the plurality of candidate media content items is an advertisement.

16. A non-transitory computer-readable storage medium having stored therein instructions which, when executed by a processor, cause the processor to perform operations comprising:
- determining that a first media content item was inserted into a first application executing at a client device, wherein the first media content item is associated with a tag;
- detecting that at least one media content presentation opportunity is available for a second media content item to be inserted into a second application executing at the client device, the second application configured for operating independently from the first application;
- determining at least the tag associated with the first media content item;
- generating one or more co-execution rules for selecting a compatible media content item for the at least one media content presentation opportunity while the first application and the second application are concurrently executing on the client device, the co-execution rules defining non-compatible tags, wherein media content items with non-compatible tags cannot be displayed in the first application and the second application during a period of time defined by the co-execution rules;
- selecting the at least one compatible media content item as the second media content item based on the one or more co-execution rules; and based on the selection, inserting the second media content item into the second application via the at least one media content presentation opportunity.

17. The non-transitory computer-readable storage medium of claim 16, wherein the generating comprises:
   determining that a third media content item was inserted into the first application executing at a client device;
   combining the co-execution rules associated with the first media content item and the third media content item inserted into the first application to yield the present context filter; and
   selecting the second media content item presented at the client device based on the selection criteria based on the combined co-execution rules.

18. The non-transitory computer-readable storage medium of claim 16, wherein each of the plurality of candidate media content items is an advertisement.

19. The non-transitory computer-readable storage medium of claim 16, wherein the applying comprises:
   comparing co-execution rules for the present context with each of the plurality of
candidate media content items; and
   filtering each of the plurality of candidate media content items according to the comparison.

20. The non-transitory computer-readable storage medium of claim 19, wherein the co-execution rules comprise at least one of an inclusion rule or an exclusion rule regarding subject matter type, a media type, or an interface element type.

21. A computing device, comprising:
   a communications interface;
   a processor; and
   a computer-readable medium, having stored thereon a plurality of instructions for causing the processor to perform operations comprising:
      determining that a first media content item was inserted into a first application executing at a client device, wherein the first media content item is associated with a tag;
      detecting that at least one media content presentation opportunity is available for a second media content item to be inserted into a second application executing at the client device, the second application operating independently from the first application;
      determining at least the tag associated with the first media content item;
      generating one or more co-execution rules for selecting a compatible media content item for the at least one media content presentation opportunity while the first application and the second application are concurrently executing on the client device, the co-execution rules defining non-compatible tags, wherein media content items with non-compatible tags cannot be displayed in the first application and the second application during a period of time defined by the co-execution rules;
      selecting the least one compatible media content item as the second media content item based on the one or more co-execution rules; and
      based on the selection, inserting the second media content item into the second application via the at least one media content presentation opportunity.

22. The computing device of claim 21, wherein the generating comprises:
   selecting the at least one compatible media content item presented at the client device based on one or more selection criteria to yield one or more identified media content items; and
   combining the media content tags associated with the identified media content items to yield the present set of device tags.

23. The computing device of claim 22, wherein the selection criteria comprises at least one a presentation time criterion.

24. The computing device of claim 21, wherein the present set of device tags specifies at least one of an exclusion rule or an inclusion rule, and wherein the selecting comprises:
   comparing the present set of device tags with each of the plurality of candidate media content items; and
   filtering each of the plurality of candidate media content items according to the comparison.

25. The computing device of claim 21, wherein each of the plurality of candidate media content items is an advertisement.

26. The computer-implemented method of claim 1, wherein the first media content item inserted into the first application, and the second media content item inserted into the second application are concurrently displayed, the first application and the second application concurrently executing on the client device.

27. The computer-implemented method of claim 1, wherein the at least one compatible media content item is selected while the first application is presenting the first media content item.

28. The computer-implemented method of claim 1, further comprising:
   generating the co-execution rules based on a level of user engagement,
   wherein the period of time to apply the non-compatible tags is lengthened based on a first level of user engagement, and the period of time is shortened based on a second level of user engagement dropping below the first level of user engagement.

* * * * *